Patented July 20, 1948

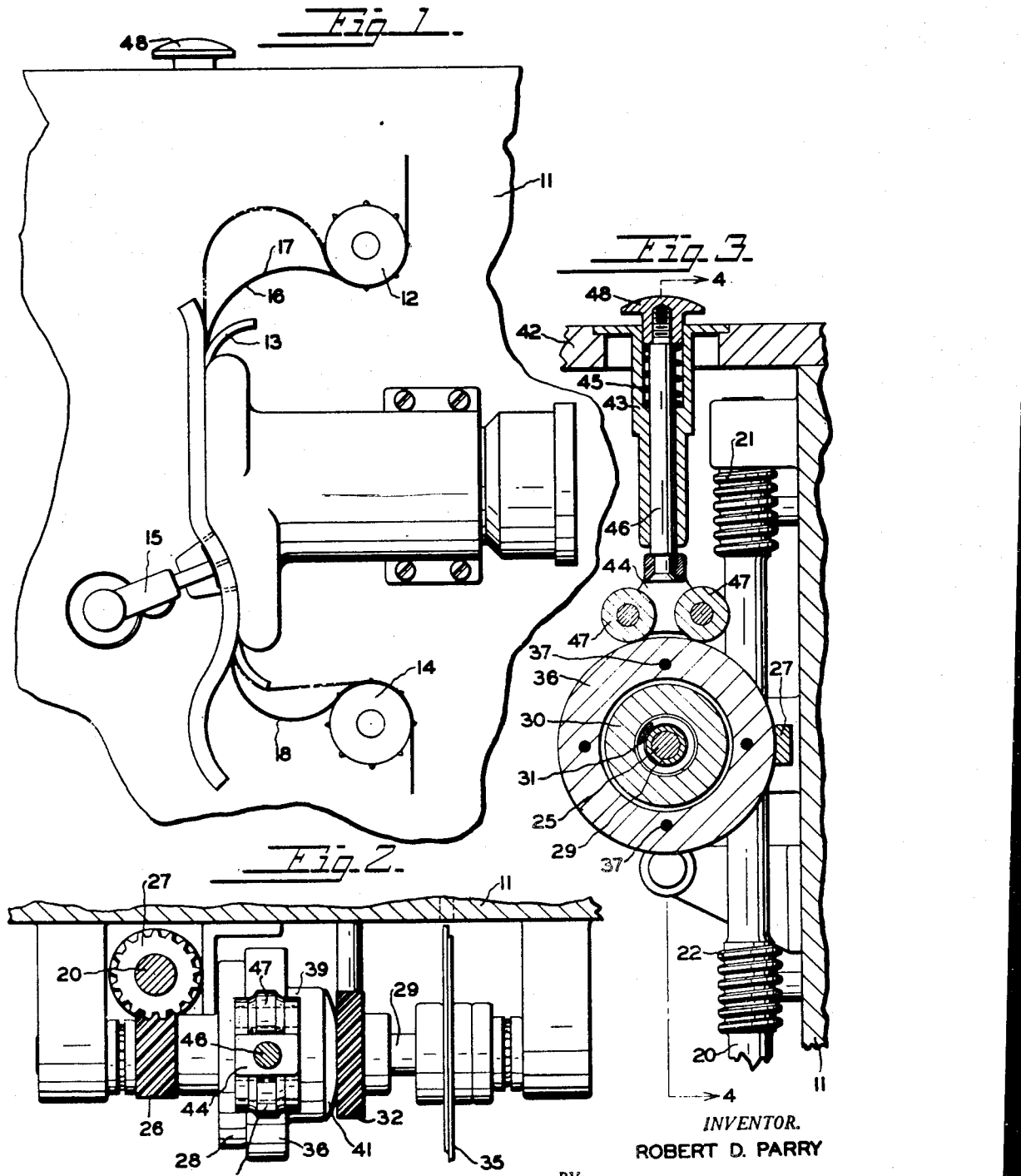

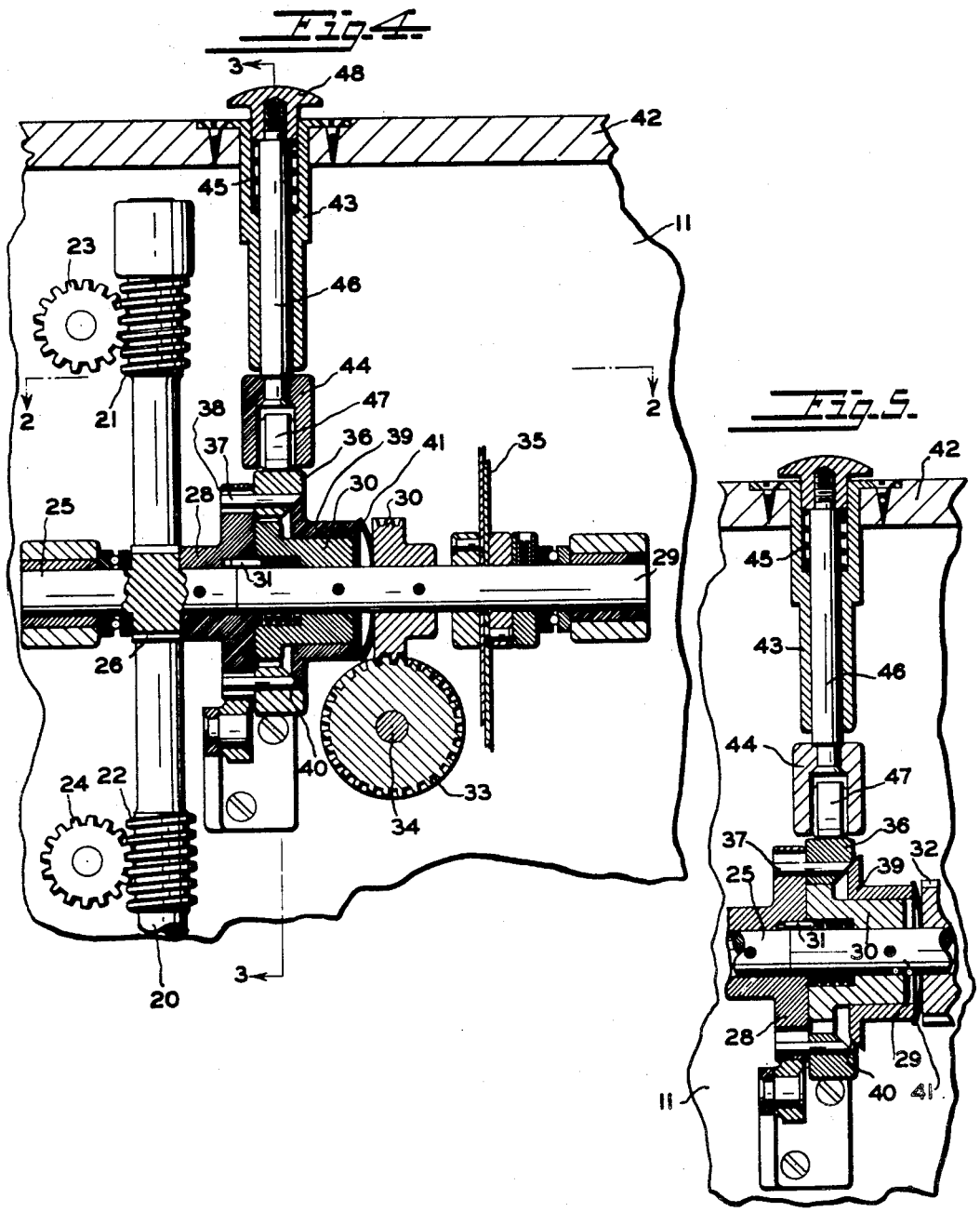

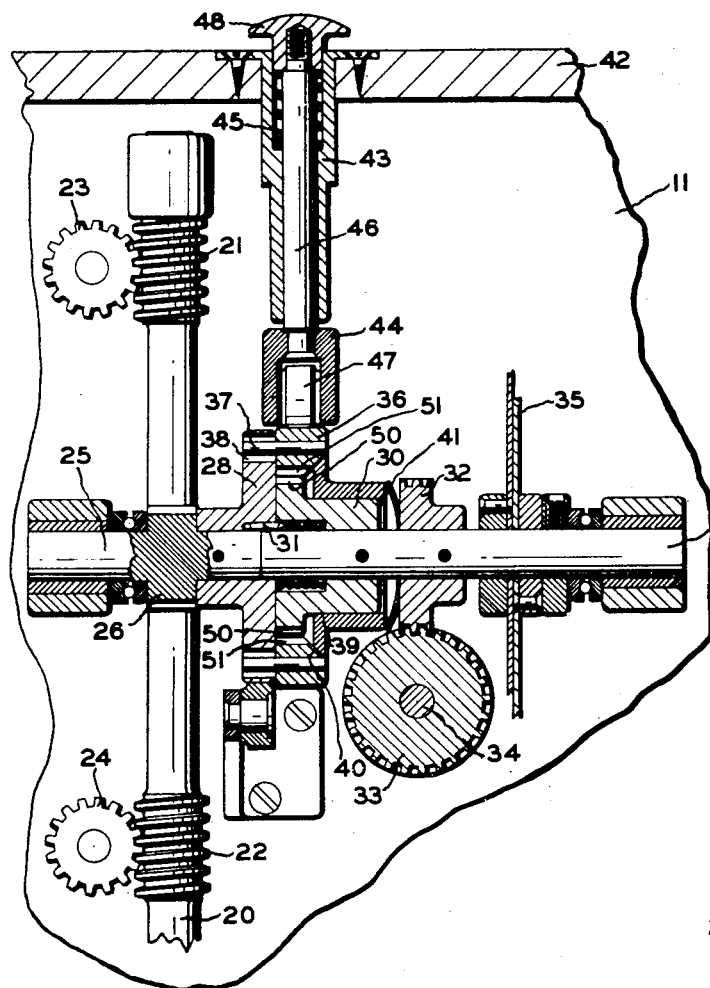
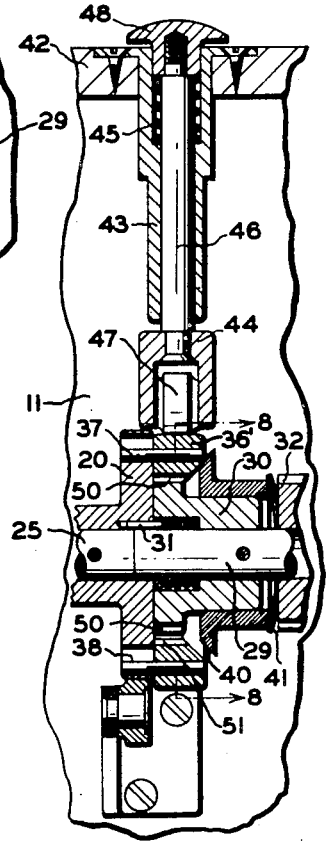
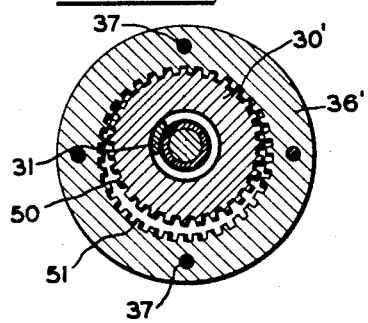

2,445,689

UNITED STATES PATENT OFFICE 2,445,689

MOTION-PICTURE APPARATUS

Robert D. Parry, Cincinnati, Ohio, assignor to Dayton Acme Co., Cincinnati, Ohio, a corporation of Ohio Application December 19, 1945, Serial No. 635,880

4 Claims. (Cl. 88—18.4)

This invention relates to motion picture projectors, and more particularly to mechanism for restoring the lower film loop on projectors using a claw-type intermittent feed mechanism. The lower film loop is sometimes lost due to defective apertures in the film or incorrect engagement of the intermittent claw with the film. Such loss of the lower film loop causes a jumpy picture and also affects the sound mechanism. It is, therefore, desirable to provide means in connection with the projector whereby the lower film loop can be restored without stopping the projector or interfering with the showing of the picture.

The object of my invention is to provide means for increasing the speed of the intermittent mechanism without affecting the speed of the feed sprockets.

A further object is to provide means extending above the projector whereby the operator can instantly effect a speeding up of the intermittent mechanism to restore the loop.

A further object is to provide novel means for increasing the speed of the intermittent mechanism.

My invention will be further readily understood from the following description and claims and from the drawings, in which latter:

Fig. 1 is a side view of a portion of a projector, incorporating my improvements.

Fig. 2 is a horizontal section view, taken in the plane of the line 2—2 of Fig. 4.

Fig. 3 is a vertical section, taken in the plane of the line 3—3 of Fig. 4.

Fig. 4 is a vertical section, viewing the mechanism from the rear face of the projector, taken in the plane of the line 4—4 of Fig. 3.

Fig. 5 is a section similar to Fig. 4, showing the knob depressed for speeding up the intermittent mechanism.

Fig. 6 is a sectional view similar to Fig. 4, showing a modification of the driving mechanism.

Fig. 7 is a companion sectional view to Fig. 6, with the knob depressed for increasing the speed of the intermittent mechanism, and;

Fig. 8 is a detail section, taken in the plane of the line 8—8 of Fig. 7.

I have shown my improved mechanism in connection with a projector 11, having an upper feed sprocket 12, a gate or pressure pad 13, and a lower feed sprocket 14, an intermittent mechanism 15 intermittently feeds the film 16 one frame at a time past the projection aperture. It is essential that a loop 17 and a loop 18 be maintained between the constant feed sprockets 12 and 14 and the intermittent mechanism 15 to permit the film to stop at the aperture while the shutter is open. After the film leaves the sprocket 14, it travels over a sound drum, not shown but well-known in the art, and it is essential that the film moves at a constant speed over the sound drum to produce good quality sound. If the film has defective apertures, or for any other reason the claw of the intermittent mechanism does not progress the film the lower loop 18 will disappear and the film will then be jerked, interfering with good projection and at times causing the film to break. As the lower loop disappears, the upper loop will increase in size and my invention is directed to mechanism for restoring the lower loop 18 without affecting the feeding of the film over the sprockets 12 and 14.

In the projector exemplified in the drawings, the mechanism is driven from a shaft 20 which receives its power from a suitable motor. Gears 21 and 22 impart rotation to gears 23 and 24 for driving the upper sprocket 12 and the lower sprocket 14 at a constant speed. A cross-shaft 25 is suitably journalled on the frame of the machine and is provided with a spiral gear 26 meshing with a spiral gear 27 on the shaft 20. A collar 28 is secured to the shaft 25. A shaft 29 in axial alignment with the shaft 25 has a member 30 fixed thereto with a spring clutch 31 interposed between the collar 28 and the member 30 for normally rotating the shafts 25 and 29 in unison. A spiral gear 32 is attached to the shaft 29 and meshes with a spiral gear 33 secured to the shaft 34 for driving the intermittent mechanism 15. The shutter 35 is also mounted on the shaft 29. A collar 36 is received about the member 30 and is provided with pins 37 received in enlarged apertures 38 in the collar 28 for forming a driving connection between the collar 28 and the collar 36. The collar 36 is normally maintained in a concentric position about the member 30 by means of an endwise movable member 39 provided with a tapered engaging face 40 and being urged into engagement with the collar 36 by means of a spring washer 41.

Projectors of this type are usually enclosed in a suitable case, the top panel of which is indicated at 42. In order to provide means for moving the collar 36 transversely to the member 30, I provide a guide 43 secured to the case 42 and carrying a spring pressed yoke 44. A spring 45 received about the guide rod 46 of the yoke, normally maintains the yoke in an "UP" position. The yoke is provided with a pair of rollers 47 engaging the collar 36 and the upper end of the rod 46 is provided with a knob 48.

In the normal operation of the projector, the parts are in the position shown in Figs. 1 to 4, inclusive; however, should the lower film loop disappear, the operator merely presses down on the knob 48 to the position shown in Fig. 5 for engaging the collar 36 with the member 30, causing the collar 36 to drive the member 30 at an increased speed for causing a speeding up of the shutter and the intermittent mechanism to restore the lower film loop 18 without interfering with the continued projection of the picture being shown. Upon release of the knob 48 the movable member 39 under the urging of the spring washer 41 returns the collar 36 to normal position.

In the modification shown in Figs. 6 to 8 inclusive, the member 30' is provided with gear teeth 50 and the collar 36' is provided with gear teeth 51. Thus, when the collar 36 is depressed, the teeth 51 will engage the teeth 50 for increasing the speed of the shaft 29.

It will be apparent from the foregoing description that I have devised a simple positive means for restoring the lower film loop without affecting the operation of the projector.

Having thus fully described my invention, what I claim as new and desire to secure by Letters Patent is:

1. In a motion picture projector having an upper constant speed film feeding sprocket, a lower constant speed film feeding sprocket, an intermittent film feeding mechanism interposed between said feed sprockets operating with a free loop between each of said feed sprockets and the intermittent mechanism, means for increasing the speed of the intermittent mechanism for restoring the lower film loop, comprising a drive shaft, a member fixed to said shaft, a floating collar having driving connection with said member, a second shaft in axial alignment with said first-named shaft, a member fixed to said second shaft and having frictional means interposed between said last-named member and said member fixed to said first-named shaft for normal driving of said second shaft, and means for transversely shifting said collar to form a drive between said collar and the member fixed to said second shaft for increasing the speed of said second shaft.

2. In a motion picture projector having an upper constant speed film feeding sprocket, a lower constant speed film feeding sprocket, an intermittent film feeding mechanism interposed between said feed sprockets operating with a free loop between each of said feed sprockets and the intermittent mechanism, means for increasing the speed of the intermittent mechanism for restoring the lower film loop, comprising a drive shaft, a member fixed to said shaft, a floating collar having driving connection with said member, a second shaft in axial alignment with said first-named shaft, a member fixed to said second shaft and having frictional means interposed between said last-named member and said member fixed to said first-named shaft for normal driving of said second shaft, and means for transversely shifting said collar to form a friction drive between said collar and the member fixed to said second shaft for increasing the speed of said second shaft.

3. In a motion picture projector having an upper constant speed film feeding sprocket, a lower constant speed film feeding sprocket, an intermittent film feeding mechanism interposed between said feed sprockets operating with a free loop between each of said feed sprockets and the intermittent mechanism, means for increasing the speed of the intermittent mechanism for restoring the lower film loop, comprising a drive shaft, a member fixed to said shaft, a floating collar having driving connection with said member, a second shaft in axial alignment with said first-named shaft, a member fixed to said second shaft and having frictional means interposed between said last-named member and said member fixed to said first-named shaft for normal driving of said second shaft, and means for transversely shifting said collar to form a gear drive between said collar and the member fixed to said second shaft for increasing the speed of said second shaft.

4. In a motion picture projector having an upper constant speed film feeding sprocket, a lower constant speed film feeding sprocket, an intermittent film feeding mechanism interposed between said feed sprockets operating with a free loop between each of said feed sprockets and the intermittent mechanism, means for increasing the speed of the intermittent mechanism for restoring the lower film loop, comprising a drive shaft, a member fixed to said shaft, a floating collar having driving connection with said member, a second shaft in axial alignment with said first-named shaft, a member fixed to said second shaft and having frictional means interposed between said last-named member and said member fixed to said first-named shaft for normal driving of said second shaft, means for shifting said collar to form a drive between said collar and the member fixed to said second shaft for increasing the speed of said second shaft, and means for normally maintaining said collar concentric with said first-named member.

ROBERT D. PARRY.

REFERENCES CITED

The following references are of record in the file of this patent:

UNITED STATES PATENTS

| Number | Name | Date |
|---|---|---|
| 1,309,990 | Uebelmesser | July 15, 1919 |
| 2,410,711 | Canady | Nov. 5, 1946 |

FOREIGN PATENTS

| Number | Country | Date |
|---|---|---|
| 441,160 | Great Britain | Jan. 14, 1936 |